(12) United States Patent
Lin (10) Patent No.: US 7,277,181 B2
(45) Date of Patent: Oct. 2, 2007

(54) INTERFEROMETRIC APPARATUS AND METHOD FOR SURFACE PROFILE DETECTION

(75) Inventor: Yaomin Lin, Hsin-Chu (TW)

(73) Assignee: Chroma Ate Inc., Taoyuan Hsien (TW)

( * ) Notice: Subject to any disclaimer, the term of this patent is extended or adjusted under 35 U.S.C. 154(b) by 111 days.

(21) Appl. No.: 11/123,978

(22) Filed: May 6, 2005

(65) Prior Publication Data

US 2005/0248770 A1  Nov. 10, 2005

(30) Foreign Application Priority Data

May 10, 2004  (TW) ............................... 93113058 A (51) Int. Cl.
*G01B 9/02* (2006.01)

(52) U.S. Cl. ...................... 356/489; 356/511

(58) Field of Classification Search ............... 356/489, 356/495, 497, 511–516
See application file for complete search history.

(56) References Cited

U.S. PATENT DOCUMENTS

| | | | | |
|---|---|---|---|---|
| 3,127,465 A * | 3/1964 | Stephens | .................... | 356/498 |
| 4,072,423 A * | 2/1978 | Kimura et al. | ............... | 356/497 |
| 4,309,109 A * | 1/1982 | Blodgett et al. | ............ | 356/506 |
| 4,636,076 A * | 1/1987 | Pettigrew | .................... | 356/499 |
| 4,848,908 A * | 7/1989 | Huang | ........................ | 356/489 |
| 5,037,206 A * | 8/1991 | Etzkorn et al. | ............. | 356/497 |
| 5,301,010 A * | 4/1994 | Jones et al. | .................. | 356/479 |
| 5,467,191 A * | 11/1995 | Kishner | ....................... | 356/513 |
| 5,926,277 A * | 7/1999 | Marron et al. | .............. | 356/512 |
| 6,018,393 A * | 1/2000 | Takishima et al. | .......... | 356/511 |
| 6,268,921 B1 * | 7/2001 | Seitz et al. | .................. | 356/407 |
| 6,317,203 B1 * | 11/2001 | Wakabayashi et al. | ... | 356/237.1 |
| 6,587,215 B2 * | 7/2003 | Davies | ........................ | 356/520 |
| 7,050,171 B1 * | 5/2006 | Banerjee et al. | ............ | 356/450 |
| 7,079,260 B2 * | 7/2006 | Montgomery | ............... | 356/511 |
| 2005/0024647 A1 * | 2/2005 | Montgomery | ............... | 356/511 |
| 2005/0248770 A1 * | 11/2005 | Lin | ............................. | 356/489 |
| 2006/0192975 A1 * | 8/2006 | Sato et al. | ................... | 356/497 |

* cited by examiner

*Primary Examiner*—Patrick Connolly
(74) *Attorney, Agent, or Firm*—Townsend and Townsend and Crew, LLP (57) ABSTRACT

An apparatus for detecting the surface profile of a test object includes a light source, a beam splitter, a reflective component, a sensor, and a computing device. The light source emits a light beam. The beam splitter divides the light beam into reference and probing beams. The reference beam is reflected by the reflective component back to the beam splitter. The reflective component is configured so that components of the reflected reference beam travel at different optical path lengths to the beam splitter. The probing beam is reflected by the test object back to the beam splitter. The beam splitter combines the reflected reference and probing beams to result in a heterodyne light beam. The sensor converts the heterodyne light beam into a corresponding electrical signal. The computing device records the converted electrical signal. A method for detecting the surface profile of the test object is also disclosed.

6 Claims, 6 Drawing Sheets

INTERFEROMETRIC APPARATUS AND METHOD FOR SURFACE PROFILE DETECTION

CROSS-REFERENCE TO RELATED APPLICATION

This application claims priority of Taiwanese application no. 093113058, filed on May 10, 2004.

BACKGROUND OF THE INVENTION

1. Field of the Invention

The invention relates to an apparatus and method for detecting the surface profile of a test object.

2. Description of the Related Art

Figure 1:
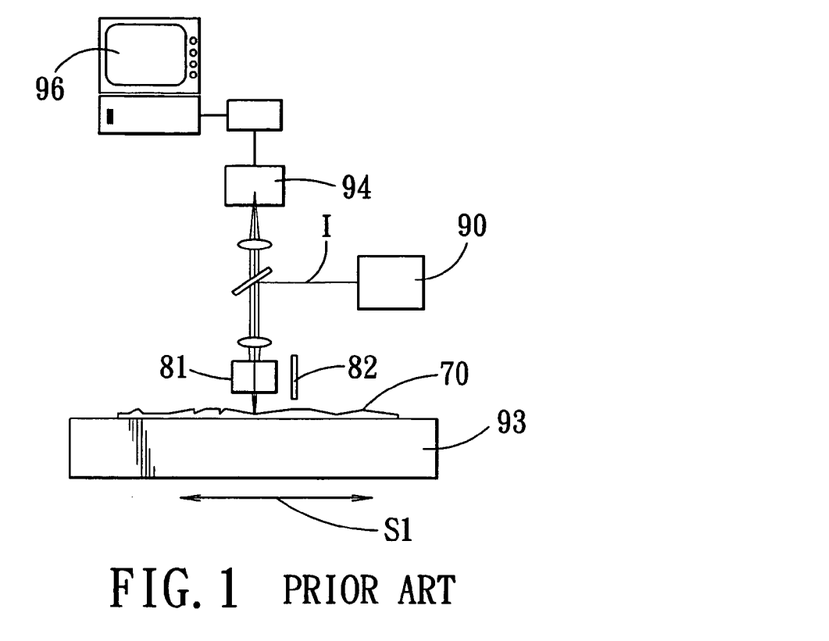
FIG. 1 is a schematic view of a conventional interferometric apparatus for surface profile detection.
Figure 2:
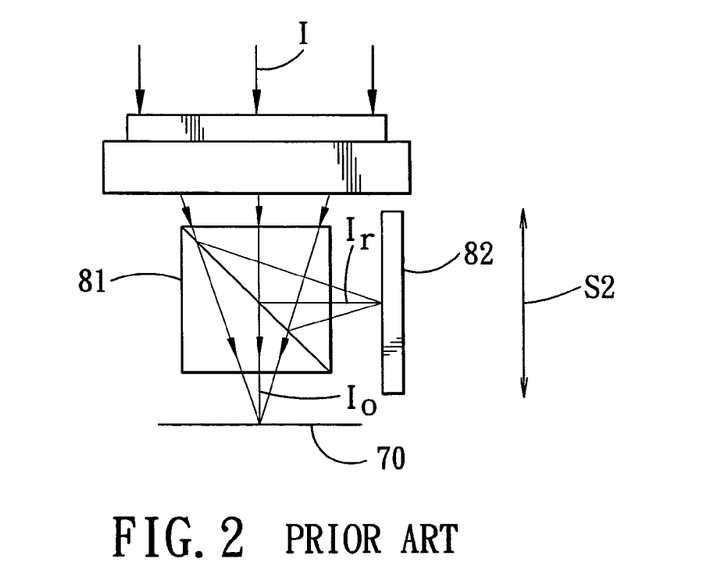
FIG. 2 is a schematic view of a beam splitter and a reflective component of the conventional interferometric apparatus.

FIGS. 1 and 2 illustrate a conventional Michelson-type interferometric apparatus that includes a light source 90, a beam splitter 81, a reflective component 82, a sensor 94, a carrier 93, and a computing device 96.

The conventional method for detecting the surface profile of a test object 70, such as semiconductor wafers and glass substrates for liquid crystal display applications, with the use of the aforementioned conventional interferometric apparatus includes the following steps:

a) enabling the light source 90 to emit a white light beam (I);

b) through a beam splitter 81, dividing the light beam (I) into a reference beam (Ir) that is directed to the reflective component 82, and a probing beam (Io) that is directed to a scanned segment of the surface of the test object 70 on the carrier 93;

c) through the beam splitter 81, combining the reference beam (Ir) reflected by the reflective component 82, and the probing beam (Io) reflected by the scanned segment of the surface of the test object 70 to result in a heterodyne light beam;

d) enabling the sensor 94 to convert the heterodyne light beam into a corresponding electrical signal;

e) enabling the computing device 96 to record the electrical signal converted in step d);

f) moving the beam splitter 81 and the reflective component 82 in a scanning direction, as indicated by arrow (S2) in FIG. 2, thereby varying the optical path length of the probing beam (Io) to result in another heterodyne light beam for the scanned segment in step c) when steps a) to e) are repeated;

g) enabling the computing device 96 to analyze the electrical signals recorded therein to determine the surface profile at the scanned segment of the test object 70; and h) moving the carrier 93 in another scanning direction, as indicated by arrow (S1) in FIG. 1, and repeating steps a) to g) to determine the surface profile of another scanned segment of the surface of the test object 70.

The aforementioned conventional method is disadvantageous in that the beam splitter 81 and the reflective component 82 are required to be moved in the scanning direction (S2) in order to determine the surface profile of a scanned segment of the test object 70. The process as such results in a slow scanning speed, and has a detrimental affect upon the efficiency of the surface profile detection operation.

SUMMARY OF THE INVENTION

Therefore, the object of the present invention is to provide an interferometric apparatus that is capable of overcoming the aforesaid drawback of the prior art.

According to one aspect of the present invention, an apparatus for detecting the surface profile of a test object comprises a light source, a beam splitter, a reflective component, a sensor, a carrier, and a computing device. The light source serves to emit a light beam. The beam splitter serves to divides the light beam into reference and probing beams. The probing beam is directed to a surface of the test object, and is reflected by the surface of the test object back to the beam splitter. The reflective component serves to receive the reference beam from the beam splitter and to reflect the reference beam back to the beam splitter. The beam splitter combines the reference beam reflected by the reflective component, and the probing beam reflected by the surface of the test object to result in a heterodyne light beam. The sensor serves to receive the heterodyne light beam from the beam splitter and to convert the heterodyne light beam into a corresponding electrical signal. The carrier is adapted to support the test object thereon, and is capable of relative movement with respect to the beam splitter in a scanning direction. The computing device is coupled to the sensor, and serves to record the electrical signal converted by the sensor. The reflective component is configured so that components of the reference beam that are reflected by the reflective component travel at different optical path lengths to the beam splitter. The beam splitter combines the components of the reference beam with components of the probing beam reflected by a set of scanned segments of the surface of the test object to result in the heterodyne light beam for the scanned segments. When relative movement is generated between the carrier and the beam splitter in the scanning direction, the beam splitter is able to combine the components of the reference beam with components of the probing beam reflected by another set of scanned segments of the surface of the test object to result in another heterodyne light beam. The computing device, with reference to a path length gradient associated with the components of the reference beam, and information pertinent to the relative movement between the carrier and the beam splitter in the scanning direction, is operable so as to analyze the recorded electrical signals corresponding to the heterodyne light beams to determine the surface profile of the test object on at least one of the scanned segments.

According to another aspect of the present invention, a method for detecting the surface profile of a test object comprises the steps of:

a) emitting a light beam;

b) through a beam splitter, dividing the light beam into reference and probing beams, the reference beam being directed to a reflective component, the probing beam being directed to a surface of the test object, the reflective component being configured so that components of the reference beam that are reflected by the reflective component travel at different optical path lengths to the beam splitter;

c) through the beam splitter, combining the reference beam reflected by the reflective component, and the probing beam reflected by the surface of the test object to result in a heterodyne light beam, the components of the reference beam being combined with components of the probing beam reflected by a set of scanned segments of the surface of the test object to result in the heterodyne light beam for the scanned segments;

d) converting the heterodyne light beam into a corresponding electrical signal;

e) recording the electrical signal converted in step d);

f) generating relative movement between the test object and the beam splitter in a scanning direction to enable combining of the components of the reference beam with components of the probing beam reflected by another set of scanned segments of the surface of the test object to result in another heterodyne light beam in step c) when steps a) to f) are repeated; and g) with reference to a path length gradient associated with the components of the reference beam, and information pertinent to the relative movement between the test object and the beam splitter in the scanning direction, analyzing the recorded electrical signals corresponding to the heterodyne light beams to determine the surface profile of the test object on at least one of the scanned segments.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
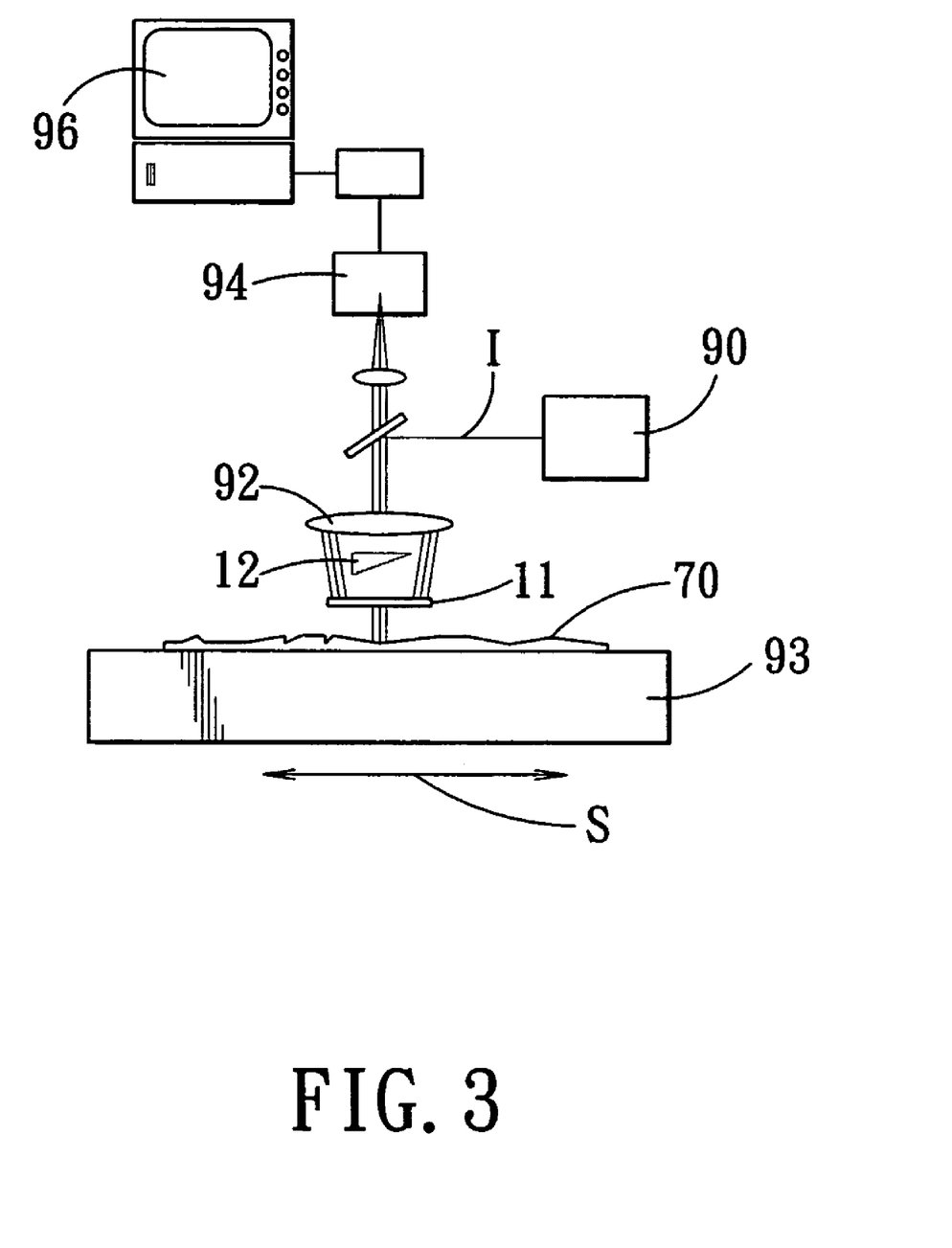
FIG. 3 is a schematic view of the first preferred embodiment of an apparatus for detecting the surface profile of a test object according to the present invention.
Figure 4:
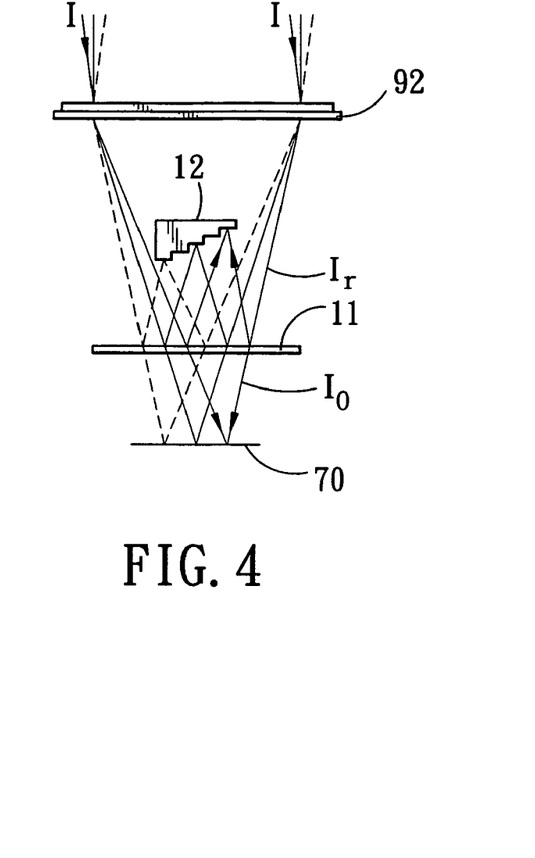
FIG. 4 is a schematic view illustrating a beam splitter and a reflective component of the first preferred embodiment.

Referring to FIGS. 3 and 4, the first preferred embodiment of an apparatus for detecting the surface profile of a test object 70 according to this invention is shown to include a light source 90, a beam splitter 11, an object lens 92, a reflective component 12, a sensor 94, a carrier 93, and a computing device 96.

The apparatus of this embodiment is Mirau-type interferometric apparatus.

The light source 90 serves to emit a white light beam (I).

Figure 7:
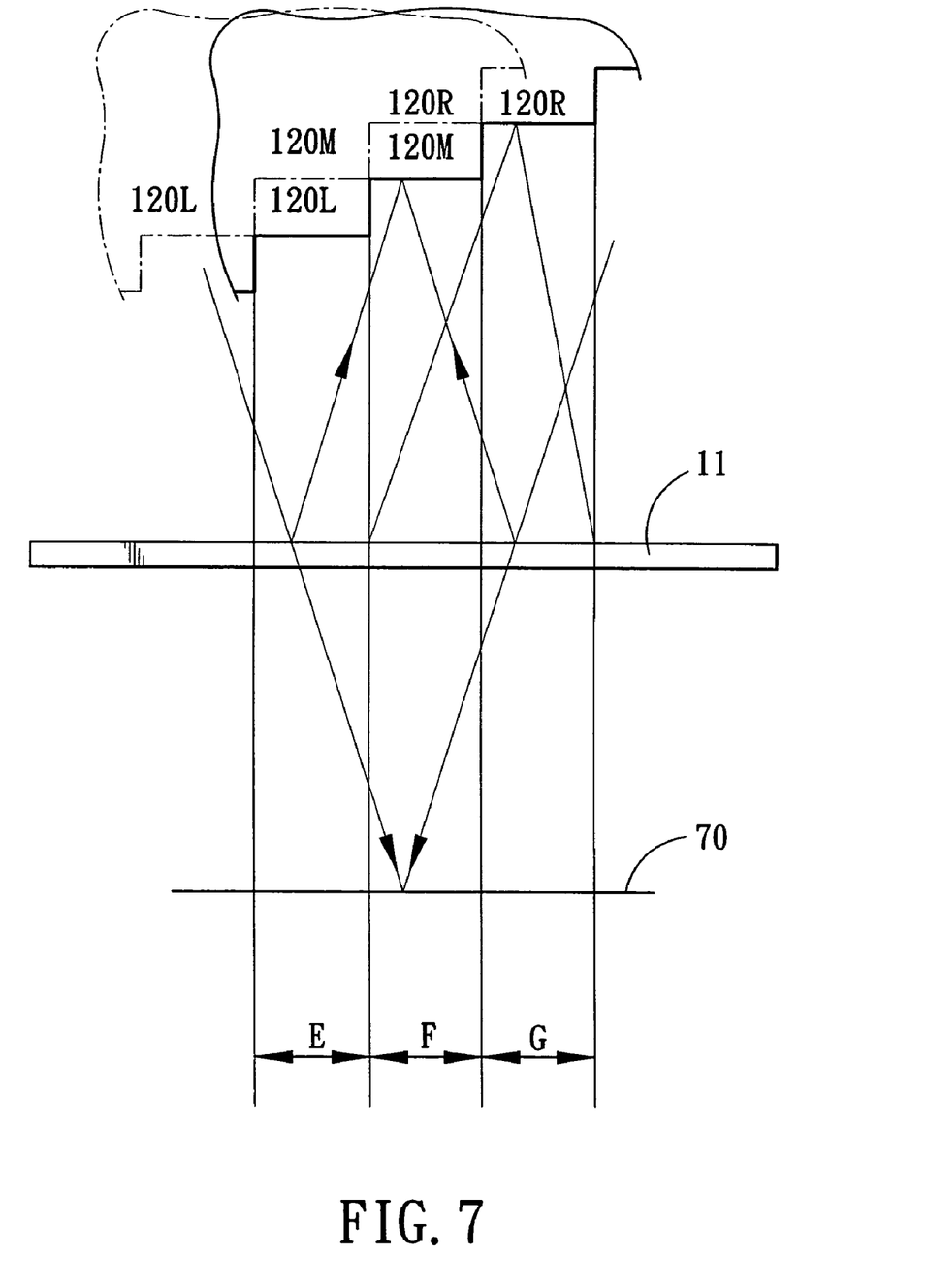
FIG. 7 is a schematic view illustrating components of a reference beam reflected by the reflective surface of the reflective component, and components of a probing beam reflected by a surface of the test object.

The beam splitter 11 serves to divide the white light beam (I) into a reference beam (Ir) that is directed to the reflective component 12, and a probing beam (Io) that is directed to a set of scanned segments (e.g., segments (E), (F), (G) in FIG. 7) of a surface of the test object 70 and that is reflected by the scanned segments of the surface of the test object 70 back to the beam splitter 11.

The object lens 92 is disposed above the beam splitter 11 for converging the white light beam (I) prior to receipt by the beam splitter 11.

The reflective component 12 is disposed above the beam splitter 11, receives the reference beam (Ir) from the beam splitter 11, and reflects the reference beam (Ir) back to the beam splitter 11.

Figure 5:
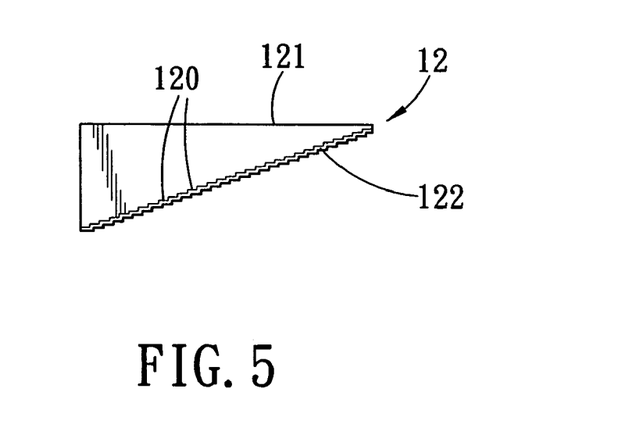
FIG. 5 is a schematic view for illustrating a reflective surface of the reflective component of the first preferred embodiment in greater detail.

With further reference to FIG. 5, the reflective component 12 has a reflective surface 122, and a flat surface 121 opposite to the reflective surface 122. The reflective surface 122 of the reflective component 12 is in a form of a series of steps 120. As such, components of the reference beam (Ir) that are reflected by the steps 120 travel at different optical path lengths to the beam splitter 11.

It is noted that the optical path length difference between two components of the reference beam (Ir) that are reflected by a pair of adjacent steps 120 is consistent with that of two components of the reference beam (Ir) that are reflected by another pair of adjacent steps 120. In this embodiment, the reflective component 12 includes a substrate that is made from a light transmissible material and that has a stepped surface coated with a reflective layer to result in the reflective surface 122.

As best shown in FIG. 4, the reflective component 12 is disposed such that the reflective surface 122 of the reflective component 12 faces the beam splitter 11.

The carrier 93 is disposed below the beam splitter 11, supports the test object 70 thereon, and is capable of relative movement with respect to the beam splitter 11 in a scanning direction, as indicated by the arrow (S) in FIG. 3.

The beam splitter 11 further serves to combine the components of the reference beam (Ir) reflected by the steps 120 of the reflective component 12, and components of the probing beam (Io) reflected by the scanned segments of the surface of the test object 70 to result in a heterodyne light beam for the scanned segments.

The sensor 94 receives the heterodyne light beam from the beam splitter 11, and converts the heterodyne light beam into a corresponding electrical signal.

The computing device 96 is coupled to the sensor 94 for recording the electrical signal converted by the sensor 94, and is further coupled to the carrier 93 for controlling movement of the carrier 93 in the scanning direction.

It is noted that when relative movement is generated between the carrier 93 and the beam splitter 11 in the scanning direction, the beam splitter 11 is able to combine the components of the reference beam (Ir) with components of the probing beam (Io) reflected by another set of scanned segments of the surface of the test object 70 to result in another heterodyne light beam.

The computing device 96, with reference to a path length gradient associated with the components of the reference beam (Ir), and information pertinent to the relative movement between the test object 70 and the beam splitter 11 in the scanning direction, i.e., relative displacement per unit time, is operable so as to analyze the recorded electrical signals corresponding to the heterodyne light beams to determine the surface profile of the test object 70 on at least one of the scanned segments.

Figure 6:
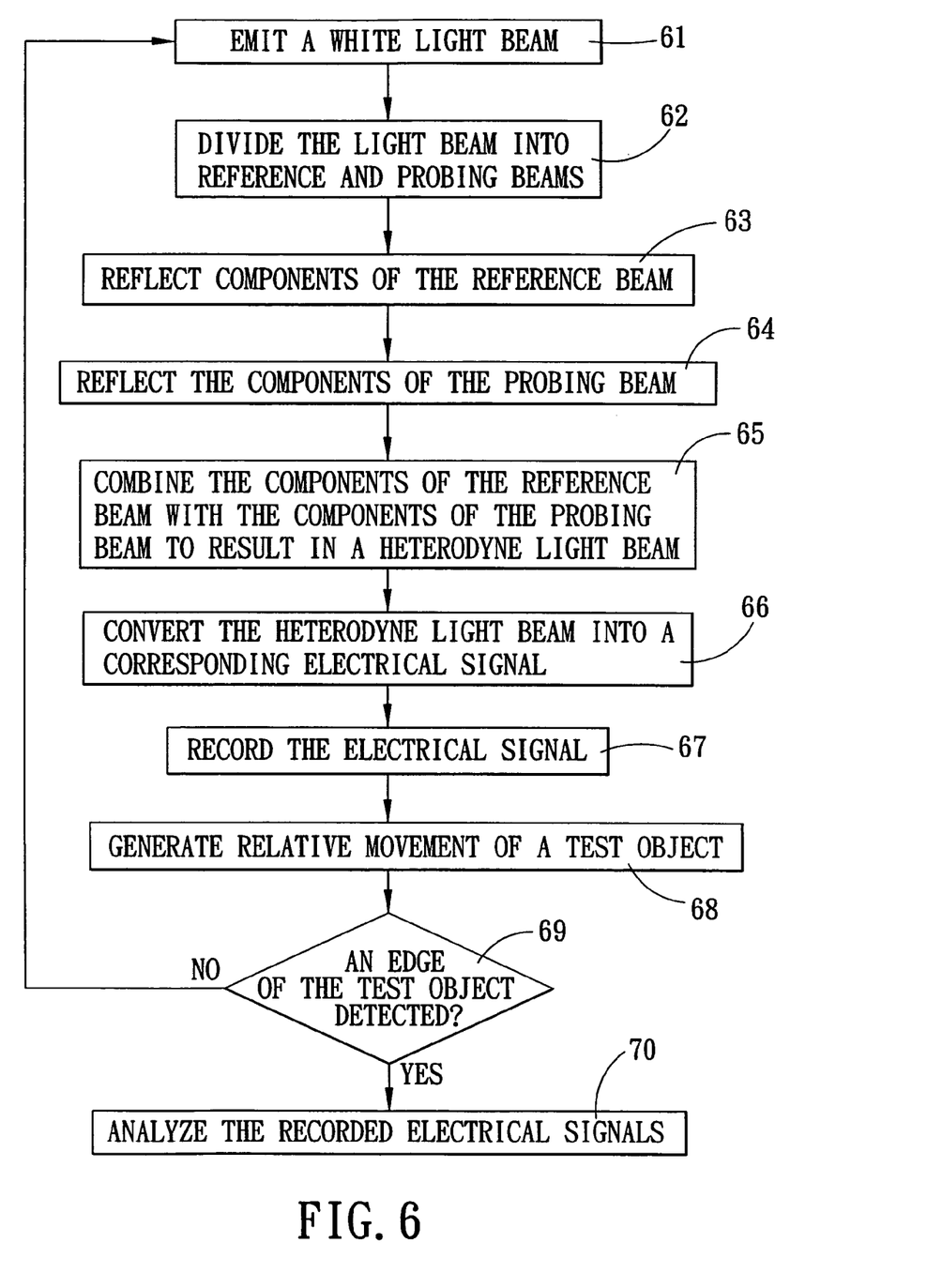
FIG. 6 is a flowchart to illustrate consecutive steps of the preferred embodiment of the method for surface profile detection according to the present invention.

The preferred embodiment of a method for detecting the surface profile of the test object 70 with the use of the apparatus according to this invention will now be described with further reference to FIG. 6.

In step 61, the light source 90 emits a white light beam (I).

In step 62, through the beam splitter 11, the light beam (I) is divided into reference and probing beams (Ir, Io).

In step 63, with further reference to FIG. 7, the steps (120L, 120M, 120R) of the reflective surface 122 of the reflective component 12 reflect the components of the reference beam (Ir) back to the beam splitter 11.

In step 64, the scanned segments (E, F, G) of the surface of the test object 70 reflect the components of the probing beam (Io) back to the beam splitter 11.

It is noted that each of the components of the reference beam (Ir) reflected in step 63 interferes with a respective one of the components of the probing beam (Io) reflected in step 64.

In step 65, through the beam splitter 11, the components of the reference beam (Ir) are combined with components of the probing beam (Io) reflected by the scanned segments (E, F, G) of the surface of the test object 70 to result in the heterodyne light beam for the scanned segments (E, F, G).

In step 66, the sensor 94 receives the heterodyne light beam from the beam splitter 11, and converts the heterodyne light beam into a corresponding electrical signal.

In step 67, the computing device 96 records the electrical signal converted in step 66.

Instep 68, the carrier 93 generates relative movement with respect to the beam splitter 11 in the scanning direction (S)

In step 69, the computing device 96 determines whether an edge of the test object 70 or whether a set of predetermined scanned segments of the surface of the test object 70 has been detected by the sensor 94. In the affirmative, the flow proceeds to step 70. Otherwise, the flow goes back to step 61.

It is noted that the relative movement generated between the carrier 93 and the beam splitter 11 in the scanning direction (S) in step 68 enables combining of the components of the reference beam (Ir) with components of the probing beam (Io) reflected by another set of scanned segments (E, F) of the surface of the test object 70 to result in another heterodyne light beam in step 65 when step 61 to 69 are repeated.

In step 70, with reference to a path length gradient associated with the components of the reference beam (Ir), and information pertinent to the relative movement between the carrier 93 and the beam splitter 11 in the scanning direction (S), i.e., relative displacement per unit time, the computing device 96 analyzes the recorded electrical signals corresponding to the heterodyne light beams to determine the surface profile of the test object 70 on at least one of the scanned segments (E, F, G).

It is evident that the apparatus of this embodiment may be operated in a continuous surface profiling mode such that steps 61 to 70 are performed without interruption.

Figure 8:
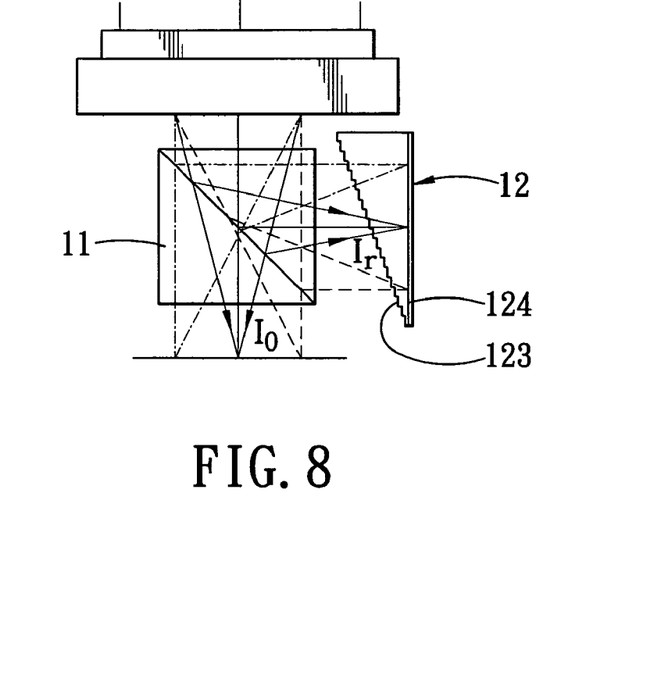
FIG. 8 is a schematic view of the second preferred embodiment of an apparatus for detecting the surface profile of a test object according to the present invention.

FIG. 8 shows the second preferred embodiment of an apparatus for detecting the surface profile of the test object 70 according to this invention. When compared with the previous embodiment, the interferometric apparatus of this embodiment is a Michelson-type interferometric apparatus. In this embodiment, the reflective component 12 is disposed beside the beam splitter 11, has a stepped surface 123 facing a lateral side of the beam splitter 11, and further has a flat surface 124 opposite to the stepped surface 123 and coated with a reflective layer to result in a reflective surface. The difference in the optical path lengths travelled by the reflected components of the reference beam (Ir) is a result of the varying thickness of the reflective component 12 attributed to the stepped surface 123.

Figure 9:
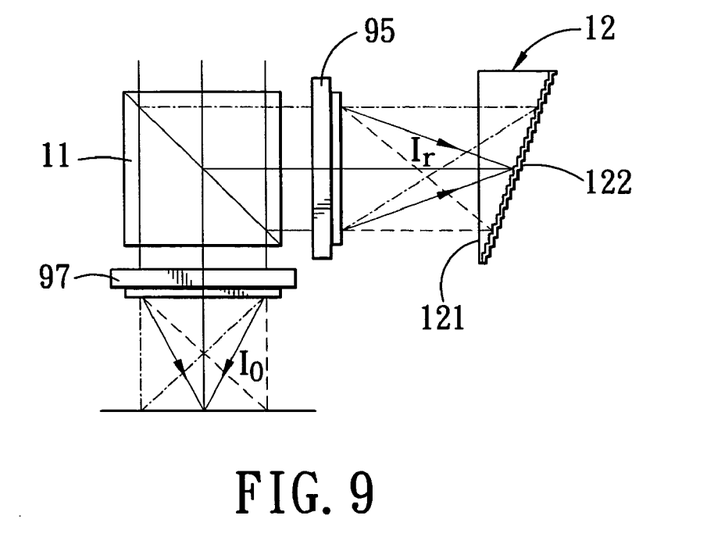
FIG. 9 is a schematic view of the third preferred embodiment of an apparatus for detecting the surface profile of a test object according to the present invention.

FIG. 9 shows the third preferred embodiment of an apparatus for detecting the surface profile of the test object 70 according to this invention. When compared with the previous embodiments, the interferometric apparatus is a Linnik-type interferometric apparatus. In this embodiment, the reflective component 12 is disposed beside the beam splitter 11 such that the flat surface 121 of the reflective component 12 faces the lateral side of the beam splitter 11, i.e., the stepped reflective surface 122 faces away from the beam splitter 11. In addition, the apparatus further includes a first object lens 95 disposed between the beam splitter 11 and the reflective component 12, and a second object lens 97 disposed between the beam splitter 11 and the carrier (not shown) for light converging purposes.

In view of the use of the reflective component 12 with the stepped configuration, it is no longer required to move the beam splitter 11 and the reflective component 12 in another scanning direction when detecting the surface profile of scanned segments of the test object 70. Accordingly, the scanning speed is faster, and the efficiency of the surface profile detection operation is enhanced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An apparatus for detecting surface profile of a test object, comprising:

a light source for emitting a light beam;

a beam splitter for dividing the light beam into reference and probing beams, the probing beam being directed to a surface of the test object and being reflected by the surface of the test object back to said beam splitter;

a reflective component for receiving the reference beam from said beam splitter and for reflecting the reference beam back to said beam splitter;

said beam splitter combining the reference beam reflected by said reflective component, and the probing beam reflected by the surface of the test object to result in a heterodyne light beam;

a sensor for receiving the heterodyne light beam from said beam splitter and for converting the heterodyne light beam into a corresponding electrical signal;

a carrier adapted to support the test object thereon and capable of relative movement with respect to said beam splitter in a scanning direction; and a computing device coupled to said sensor for recording the electrical signal converted by said sensor;

wherein said reflective component is configured so that components of the reference beam that are reflected by said reflected component travel at different optical path lengths to said beam splitter;

wherein said beam splitter combines the components of the reference beam with components of the probing beam reflected by a set of scanned segments of the surface of the test object to result in the heterodyne light beam for the scanned segments;

wherein, when relative movement is generated between said carrier and said beam splitter in the scanning direction, said beam splitter is able to combine the components of the reference beam with components of the probing beam reflected by another set of scanned segments of the surface of the test object to result in another heterodyne light beam;

wherein, said computing device, with reference to a path length gradient associated with the components of the reference beam, and information pertinent to the relative movement between said carrier and said beam splitter in the scanning direction, is operable so as to analyze the recorded electrical signals corresponding to the heterodyne light beams to determine the surface profile of the test object on at least one of the scanned segments.

2. The apparatus as claimed in claim 1, wherein said light source emits a white light beam.

3. The apparatus as claimed in claim 1, further comprising an object lens disposed in the path of the light beam emitted by said light source.

4. The apparatus as claimed in claim 1, wherein said reflective component includes a substrate made from a light transmissible material, said substrate having a flat surface and a stepped surface opposite to said flat surface, one of said flat and stepped surfaces being coated with a reflective layer to result in a reflective surface for said reflective component.

5. The apparatus as claimed in claim 1, further comprising a first object lens disposed between said beam splitter and said reflective component.

6. The apparatus as claimed in claim 5, further comprising a second object lens disposed between said beam splitter and said carrier.

* * * * *